United States Patent [19]
Tatsuzawa

[11] 4,318,119
[45] Mar. 2, 1982

[54] CONTINUOUS CARRIER WAVE GENERATING CIRCUIT

[75] Inventor: Kaichi Tatsuzawa, Yokohama, Japan
[73] Assignee: Sony Corporation, Tokyo, Japan
[21] Appl. No.: 102,974
[22] Filed: Dec. 14, 1979
[30] Foreign Application Priority Data
  Dec. 19, 1978 [JP] Japan .................. 53-157130
[51] Int. Cl.³ .............. H04N 5/76; H04N 9/44; H04N 5/78
[52] U.S. Cl. .......................... 358/8; 358/18; 360/38
[58] Field of Search .................. 358/8, 18; 360/38

[56] References Cited
U.S. PATENT DOCUMENTS

| | | | |
|---|---|---|---|
| Re. 28,823 | 5/1976 | Coleman, Jr. ............... | 358/18 |
| 3,974,519 | 8/1976 | van den Bussche ............... | 360/38 X |
| 4,012,774 | 3/1977 | Kuniyoshi et al. ............... | 360/38 X |
| 4,024,572 | 5/1977 | Derenbecher, Jr. ............... | 358/18 |
| 4,137,547 | 1/1979 | Yamamitsu et al. ............... | 358/8 |
| 4,178,607 | 12/1979 | Mikado ............... | 358/8 |
| 4,208,674 | 6/1980 | Kunihoshi et al. ............... | 358/8 |

*Primary Examiner*—Aristotelis M. Psitos
*Attorney, Agent, or Firm*—Lewis H. Eslinger; Alvin Sinderbrand

[57] ABSTRACT

A generating circuit regenerates a color sub-carrier of a PAL color television system on the basis of a reproduced horizontal sync (synchronizing) pulse and a color burst signal. In order to avoid discontinuity of the regenerated sub-carrier due to signal drop-outs, the reproduced sync pulse is supplied to a counter type automatic frequency control (AFC) circuit which can supply a continuous horizontal frequency signal in spite of drop-outs of the reproduced horizontal sync pulse. When the reproduced burst signal is dropped out, the phase of the sub-carrier signal is changed from one phase to another, for example, from +135° to −135°, in order to maintain the swinging conditions of the sub-carrier sequence of the PAL color television system.

9 Claims, 75 Drawing Figures

FIG. 1

CONTINUOUS CARRIER WAVE GENERATING CIRCUIT

BACKGROUND OF THE INVENTION

1. Field of the Invention

This invention relates generally to a sub-carrier generator, and particularly to a circuit that regenerates a PAL color sub-carrier on the basis of a reproduced horizontal sync pulse and burst signal.

2. Description of the Prior Art

It is necessary that the output or reproduced video signal from, for example, a helical scan VTR (video tape recorder), have any time base error removed therefrom by means of a time base corrector. Generally, in the time base corrector, a video signal reproduced from the magnetic tape is sampled by a clock pulse that is synchronized with the reproduced video signal and that has a frequency which is 3 or 4 times that of the usual chrominance sub-carrier signal, and then digitized into 8 bit code for each sample. The digitized video signal is written into a memory by the clock pulse which includes any time base error. The memorized video signal is fetched or read from the memory by a clock pulse whose time base is fixed to thereby remove any time base error. The clock pulse including a time base error is generated on the basis of a sync signal and a burst signal, both reproduced from the tape. However, when the reproduced video signal contains a signal skew and/or a drop-out, it is difficult to produce a continuous sub-carrier signal from which the clock pulse may be derived. Thus, when a skew or drop-out appears in a line of the reproduced video signal to disturb the reproduced sync and burst signals, not only the corresponding line of the video signal, but also a few additional lines thereof are disturbed.

OBJECTS AND SUMMARY OF THE INVENTION

Accordingly, an object of the present invention is to provide a novel carrier wave generator which continuously generates a carrier wave having the same time base error as that of a reproduced video signal.

Another object of the invention is to provide a carrier wave generator, as aforesaid, which is rapid in recovery time even if there are a signal drop-out and a skew jitter in the reproduced signal.

A further object of the invention is to provide a sub-carrier wave generator which can produce a continuous color subcarrier signal even when the reproduced burst signal is dropped out in the case that a reproduced color video signal is of the PAL color television system.

According to an aspect of the present invention, an automatic frequency control (AFC) circuit using the horizontal sync pulse and an automatic phase control (APC) circuit are combined to provide for generation of a continuous wave having a suitable frequency, such as that of a color sub-carrier or 3 or 4 times the color sub-carrier frequency.

In the foregoing combination, if the reproduced burst signal is dropped out, the APC circuit generates a carrier wave which maintains its previous phase condition. However, in accordance with the PAL color television system, the sub-carrier phase is required to change over between +135° and −135° alternately line-by-line. Therefore, in a generating circuit according to the invention, when the reproduced burst is dropped out, the sub-carrier signal derived from the APC circuit is forcibly converted to maintain the continuity of the PAL color sub-carrier signal.

A further feature of the present invention resides in the use of a dividing counter in the AFC circuit which can return to its count start condition and can be reset by a reproduced horizontal sync pulse when a skew jitter occurs so as to recover quickly from the influence of the skew jitter. In a circuit according to this invention, the dividing counter is also utilized to detect a drop-out, and to this end, there are provided a memory which stores the contents of the dividing counter at a particular timing and a digital comparator which compares the actual contents of the counter with the memorized data. The foregoing particular timing is desirably provided from the reproduced burst, but, by the provision of the memory and digital comparator, even if this burst signal is dropped out, the particular timing can be provided or maintained by the digital comparator.

It will be seen that, by the circuit using the above AFC circuit and APC circuit according to this invention, a continuous color sub-carrier signal and a sampling clock pulse, for example, for use in a time base corrector or the like, can be generated.

The above, and other objects, features and advantages of the present invention, will become apparent from the following detailed description which is to be read in conjunction with the accompanying drawings in which like references designate the same elements.

DESCRIPTION OF THE PREFERRED EMBODIMENT

Figure 1:
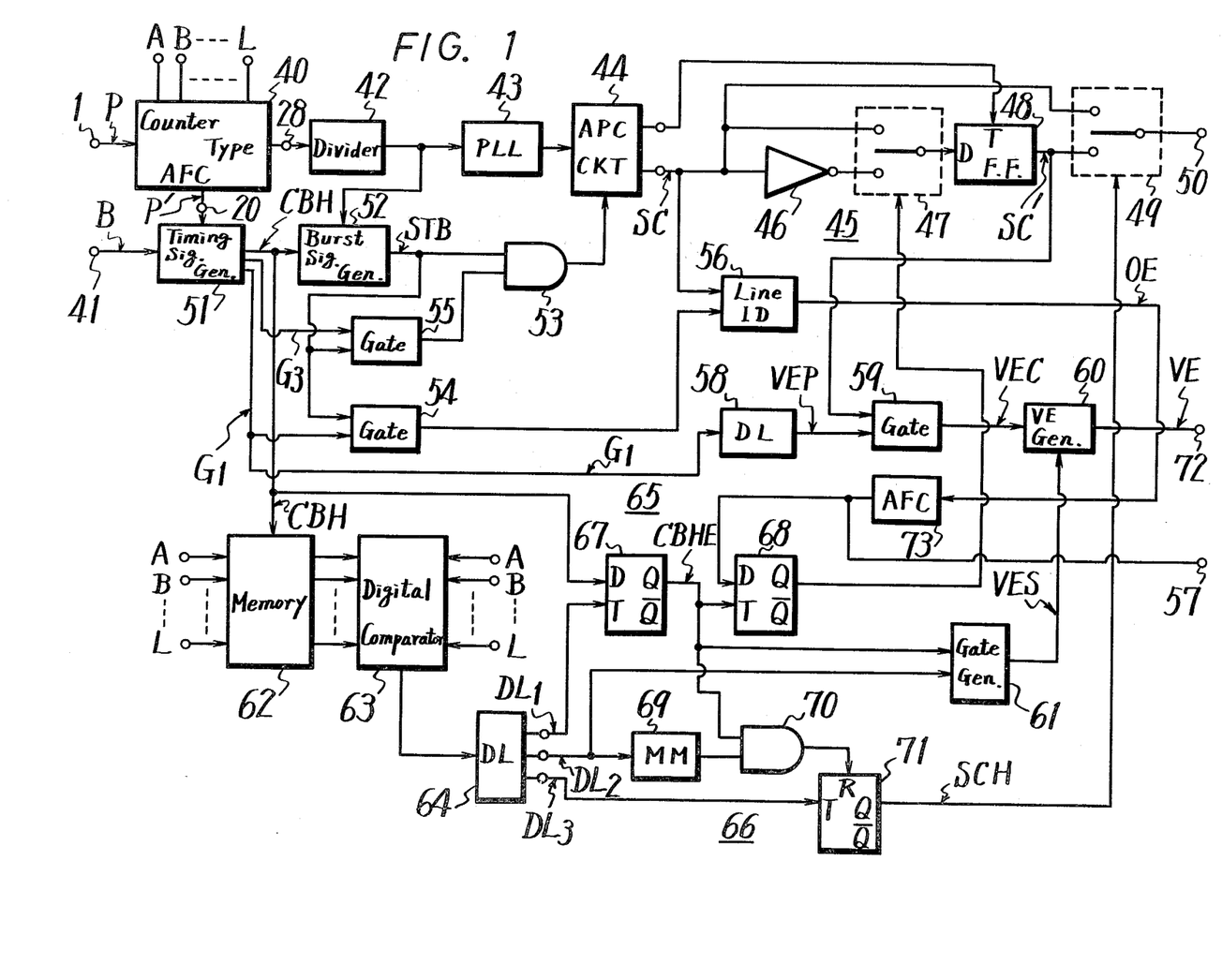
FIG. 1 is a block diagram showing a continuous carrier wave generating circuit according to an embodiment of the present invention.

Referring to the drawings in detail, and initially to FIG. 1 thereof, it will be seen that the present invention is there illustrated as being applied to a write-in clock signal generating circuit of a time base error correcting device for removing time base fluctuations from a PAL color video signal reproduced by means of a video tape recorder (VTR). In FIG. 1, an input terminal 1 receives a reproduced horizontal sync (synchronizing) signal P which is suitably separated from a color video signal reproduced from magnetic tape, and another input terminal 41 receives a reproduced burst signal B which is also suitably separated from the reproduced color video signal. The reproduced horizontal sync signal P is supplied from input terminal 1 to a counter-type automatic frequency control (AFC) circuit 40 having a first output terminal 20 at which there is produced a continuous synthesized horizontal sync signal P′, and a second output terminal 28 at which, for example, there is produced an output signal having a frequency which is four times the color sub-carrier frequency $f_{SC}$.

Figures 2A, 2B:
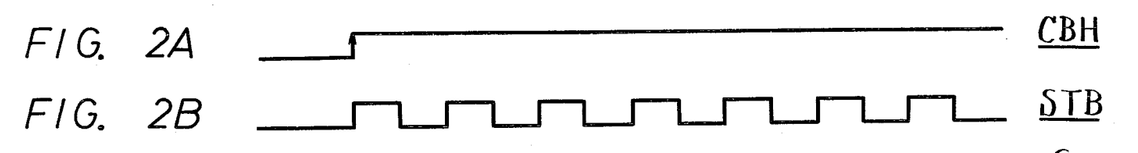
FIGS. 2A–2I and FIGS. 3A–3H are waveform diagrams to which reference will be made in explaining the invention.
Figure 2C:
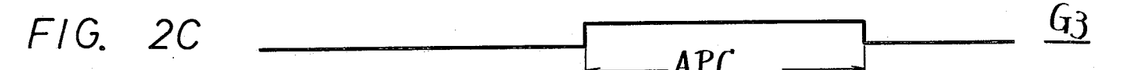
Figure 2D:
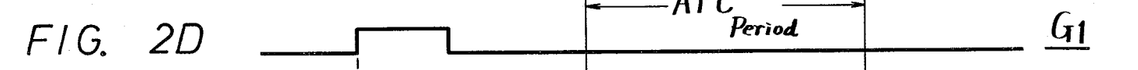
Figure 2E:
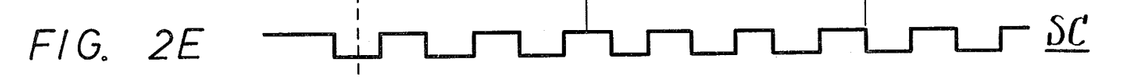
Figure 3A:
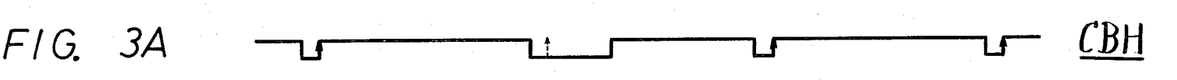
Figure 3B:
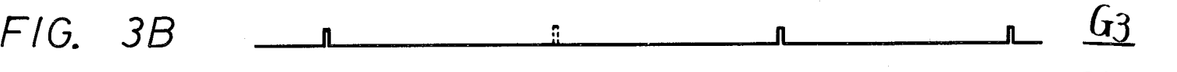

A timing signal generating circuit 51 receives the reproduced burst signal B from input terminal 41 and also the synthesized horizontal sync signal P' from output terminal 20 of AFC circuit 40, and generates therefrom a phase timing signal CBH (FIGS. 2A and 3A) which represents the phase of the zero-cross over point at the central portion of the reproduced burst signal B. The signal with a frequency four times the color sub-carrier frequency $f_{SC}$, that is, 1135 times the horizontal frequency, provided at output 28 of AFC circuit 40 is applied to a frequency divider 42 to be frequency-divided therein by 4. The resulting signal with the color sub-carrier frequency $f_{SC}$ is supplied from frequency divider 42 to a burst signal generating circuit 52 which also receives the phase timing signal CBH from the timing signal generating circuit 51 so as to produce therefrom a synthesized burst signal STB (FIG. 2B). The signal with the color sub-carrier frequency $f_{SC}$ produced by frequency divider 42 is also applied to a phase-locked loop (PLL) circuit 43 which is suitably arranged to provide a signal with a frequency 12 times the color sub-carrier frequency $f_{SC}$ and supplies the same to an automatic phase control (APC) circuit 44. The APC circuit 44 also receives the synthesized burst signal STB from burst signal generating circuit 52, for example, by way of an AND circuit 53 so as to provide, at one output of APC circuit 44, a color sub-carrier signal SC (FIG. 2E). A signal with a frequency 4 times the color sub-carrier frequency $f_{SC}$ is provided at another output of APC circuit 44 and is supplied, as a clock signal, to a D-type flip-flop circuit 48 which, as hereinafter described, acts as a delay circuit. Although the frequency divider 42 and the PLL circuit 43 are shown to be included in the embodiment of this invention illustrated on FIG. 1, such components are not always necessary.

Figure 2F:
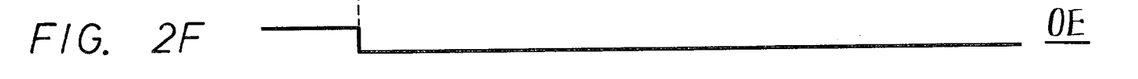

In any case, a phase converting circuit 45 is provided to convert the phase of the color sub-carrier signal SC from APC circuit 44 from $\theta_1$ to $\theta_2$, or from $\theta_2$ to $\theta_1$, with $\theta_1$ and $\theta_2$ being $+135°$ and $-135°$, respectively, in the case of a PAL color video signal. In order to provide the foregoing function, the color sub-carrier signal SC from APC circuit 44 is shown to be directly supplied to one of the fixed contacts of a first switch 47 which, at its other fixed contact, receives an inverted version of the color sub-carrier signal SC through an inverter 46. The movable contact of switch 47 is shown to be connected to a D-terminal of the D-type flip-flop circuit 48 which has a delay time equivalent to one-quarter of the color sub-carrier period, that is, a delay of 90° in phase angle. Thus, when first switch 47 is changed-over, the phase of the converted color sub-carrier signal SC' (FIG. 2I) is converted from $\theta_1$ to $\theta_2$ or from $\theta_2$ to $\theta_1$. A second switch 49 is shown to be provided with one of its fixed contacts receiving the color sub-carrier signal SC directly from the APC circuit 44, while the other fixed contact of switch 49 receives the phase converted color sub-carrier signal SC' from D-type flip-flop circuit 48. The movable contact of second switch 49 is connected to an output terminal 50 and is suitably changed-over between the two fixed contacts of the switch so that either the color sub-carrier signal SC or the phase converted color sub-carrier signal SC' is selectively delivered to output terminal 50 for providing, at such output terminal, a color sub-carrier signal of the PAL color system having the correct phase whether or not a drop-out has occurred in the input or reproduced burst signal.

Continuing with the circuit arrangement shown on FIG. 1, it will be seen that a memory 62 is provided to memorize or store the counts or contents A, B,–, L of the counter-type AFC circuit 40 at the times established by the phase timing signal CBH from timing signal generating circuit 51. A digital comparator 63 is provided to compare the count or contents A, B,–, L of AFC circuit 40 at any time with the count contents A, B,–, L stored in memory 62 for a preceding line.

The synthesized burst signal STB from burst signal generating circuit 52 is supplied to gate circuits 54 and 55 as well as to one input of the previously-mentioned AND circuit 53. Gate circuit 54 is further supplied with a gate signal $G_1$ (FIG. 2D) which is provided by timing signal generating circuit 51 for extracting or passing through gate circuit 54 the first wave of the synthesized burst signal STB. The gate circuit 55 is supplied with a gate signal $G_3$ (FIG. 2C) which is also provided by the timing signal generating circuit 51, and which is effective to cause gate circuit 55 to extract or pass three predetermined waves, for example, the fourth to sixth waves, of the synthesized burst signal STB. The output of gate circuit 55 is shown to be applied to a second input of AND circuit 53 so that the output of the latter, when applied to APC circuit 44, causes the latter to make the phase of its output carrier signal SC coincide with the phase of the input burst signal B. A line identification circuit 56 is supplied with the color sub-carrier signal SC from APC circuit 44 and with the first wave of the synthesized burst signal STB from gate circuit 54 and, on the basis thereof, provides a line identifying signal OE which indicates whether the reproduced burst signal received at input terminal 41 is from an odd or even line.

Figure 3C:
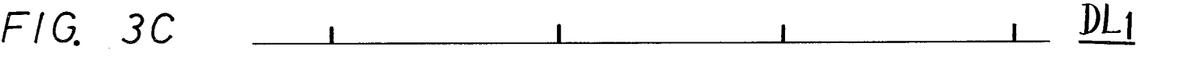
Figures 3D, 3E:
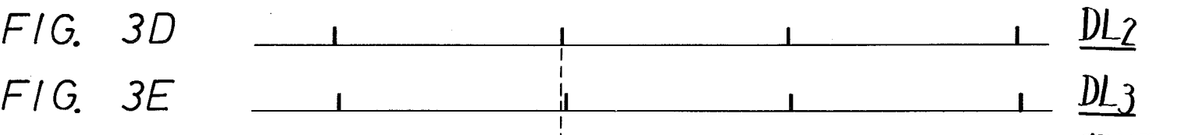
Figure 3F:
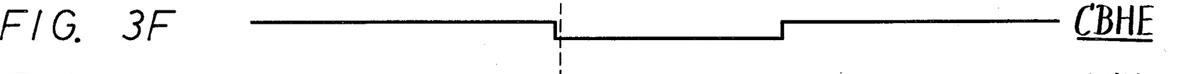

A first control circuit 65 is provided to control phase converting circuit 45 on the basis of the phase timing signal CBH from timing signal generating circuit 51, the compared output from digital comparator 63 and the signal OE from line identification circuit 56. More particularly, the phase timing signal CBH is shown to be fed to a D-input terminal of a D-type flip-flop circuit 67, and the compared or coincident output from digital comparator 63 is fed to a delay circuit 64 which produces a first delayed output $DL_1$ (FIG. 3C) applied to a T-input terminal of flip-flop circuit 67. Flip-flop circuit 67 is responsive to the foregoing inputs thereto to provide, at a Q-output terminal, a detected output CBHE (FIG. 3F) in accordance with the absence or existence of the reproduced burst signal B. The detected output CBHE is supplied to a T-input terminal of another D-type flip-flop circuit 68. The output OE (FIG. 2F) from line identification circuit 56 is shown to be delivered through an AFC circuit 73, which functions as a flywheel circuit, to an output terminal 57 and to a D-input terminal of flip-flop circuit 68. In response to the described signals applied to the input terminals of flip-flop circuit 68, the latter provides, at a Q-output terminal thereof, a control signal which is applied to first switch 47 of phase converting circuit 45 for determining the state or condition of such switch 47. When the phase converting circuit 45 is changed over by the control signal from first control circuit 65, the phase of the color sub-carrier signal SC delivered by APC circuit 44 is converted from $\theta_1$ to $\theta_2$, or from $\theta_2$ to $\theta_1$, so as to be delivered as the phase converted color sub-carrier signal SC'.

Figure 3G:
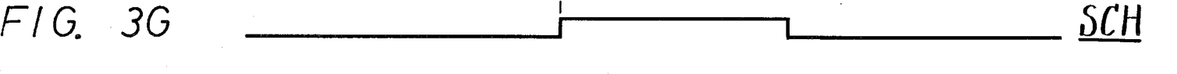

A second control circuit 66 is also provided to detect the existence of the reproduced burst signal B on the basis of the phase timing signal CBH from timing signal generating circuit 51 and the compared output from digital comparator 63, and for controlling the second switch 49 accordingly. More particularly, a second delayed output DL$_2$ (FIG. 3D) from delay circuit 64 is applied to a monostable multivibrator 69 whose output is supplied to one input of an AND circuit 70 which, at another input, receives the detected signal CBHE from the output Q of flip-flop circuit 67. The output from AND circuit 70 is applied to an R-input terminal of a flip-flop circuit 71 which is supplied, at a T-input terminal, with a third delayed output DL$_3$ (FIG. 3E) from delay circuit 64. The flip-flop circuit 71 produces, at its Q-output terminal, a control signal SCH (FIG. 3G) which indicates the existence or absence of the reproduced burst signal B and which is applied to second switch 49 as the control or switching signal therefor. When there is no drop-out in the reproduced burst signal B, the color sub-carrier signal SC from APC circuit 44 is delivered to output terminal 50. On the other hand, when any drop-out occurs in the reproduced burst signal B, the phase converted color sub-carrier signal SC' from phase converting circuit 45 is delivered to output terminal 50. For example, in the case where the reproduced burst signal exists on a particular line and its phase is $\theta_1$ (equals $+135°$), the color sub-carrier signal SC in synchronism with the phase of the reproduced burst signal B is derived from APC circuit 44 and delivered to output terminal 50. However, if the reproduced burst signal is dropped out at the next line, the color sub-carrier signal SC from APC circuit 44 will have substantially the same phase $\theta_1$ as the burst signal of the preceding line. Therefore, in such case, color sub-carrier signal SC is applied through phase converting circuit 45 to convert the phase of the color sub-carrier signal to $\theta_2$ (equal to $-135°$) and, thence, fed to output terminal 50 so as to maintain the continuity of the PAL color sub-carrier signal. It will be appreciated that phase converting circuit 45 always converts the phase of the color sub-carrier signal SC from $\theta_1$ to $\theta_2$, or from $\theta_2$ to $\theta_1$, and applies the resulting phase converted color sub-carrier signal SC' to one of the fixed contacts of the second switch 49 so that the latter determines whether the color sub-carrier signal SC or the phase converted color sub-carrier signal SC' will be applied to output terminal 50.

Although first and second switches 47 and 49 are illustrated as having mechanically movable contacts selectively engageable with one or the other of the fixed contacts of the respective switches, it will be appreciated that switches 47 and 49 are preferably constituted by electronic switching elements which perform the desired switching or change-over actions in response to the respective control signals from first and second control circuit 65 and 66, respectively.

Figure 2G:
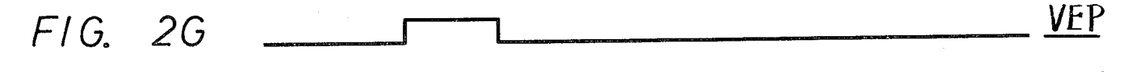
Figure 2H:
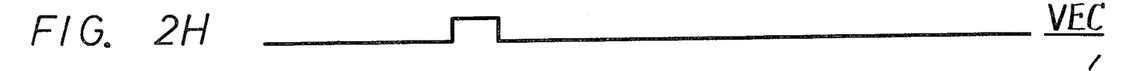
Figure 2I:
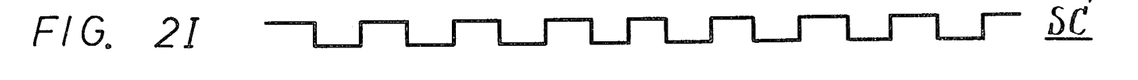
Figure 3H:
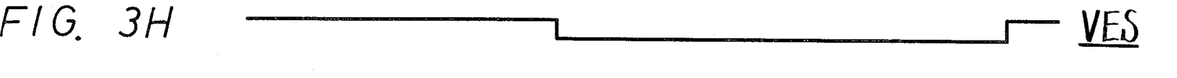

The illustrated write-in clock signal generating circuit is further operative, as hereinafter described in detail, to provide a velocity error signal which may be supplied to a readout clock signal generating circuit (not shown). More particularly, the gate signal G$_1$ (FIG. 2D), which is provided by timing signal generating circuit 51 in synchronism with the phase timing signal CBH is supplied to a delay circuit 58 which, in turn, provides a delayed gate signal VEP (FIG. 2G). The phase converted color subcarrier signal SC' from phase converting circuit 45 and the gate signal VEP from delay circuit 58 are both supplied to gate circuit 59 which detects a velocity error and provides a corresponding detected output VEC (FIG. 2H) during the coincidence of the high level of phase converted sub-carrier signal SC' with the high level of gate signal VEP. Such detected output VEC is supplied to a velocity error signal generating circuit 60 which delivers a velocity error signal VE to an output terminal 72. The output CBHE (FIG. 3F) at the Q-output terminal of flip-flop circuit 67 and the second delayed output DL$_2$ from delay circuit 64 are supplied to a gate signal generating circuit 61 which, in accordance with such inputs, produces a gate signal VES (FIG. 3H) having a time width or duration of one horizontal period and which is applied to the velocity error signal generating circuit 60. The gate signal VES indicates, when it is at the logic "1" level, that a correct velocity error signal is being obtained. On the other hand, when the gate signal VES declines to the logic "0" level during two horizontal periods, such condition indicates drop-out of the reproduced burst signal. When the velocity error signal VE is being obtained, a phase comparison is effected with respect to the phase $\theta_2$ while the phase of the reproduced burst signal is $\theta_1$, whereas the phase comparison is effected in respect to the phase $\theta_1$ when the phase of the reproduced burst signal is $\theta_2$, thereby to avoid any influence of the burst swing of the PAL color video system.

A practical example of the counter-type AFC circuit 40 that may be advantageously used in the circuit of FIG. 1 will now be described in detail with reference to FIG. 4. More particularly, the AFC circuit 40 is there shown to include a phase-locked loop (PLL) circuit generally indicated at 21, and which includes a variable frequency oscillator 27 having a center frequency which is N times the horizontal frequency (N being 1135 so that the center frequency is four times the color sub-carrier frequency in the example being described). A counter 29 is provided in PLL 21 to frequency-divide by N the carrier signal obtained from variable frequency oscillator 27. The counter 29 is shown to have a clock pulse input terminal CK which receives the carrier signal or oscillating output from variable frequency oscillator 27, and counter 29 further has a carry output terminal CARRY from which a carry output CR (FIGS. 5F, 6F, 7F and 8F) is supplied to a clear input terminal CL of counter 29 through a NOR circuit 17. A phase comparator circuit 24 is supplied with a signal HP (FIGS. 5E, 6E, 7E and 8E) which, as hereinafter described, has a predetermined phase relation to the reproduced horizontal sync signal P (FIGS. 5A, 6A, 7A, 8A and 9A), and also with the carry output CR from counter 29 by way of a first gate circuit 30 so as to phase-compare the received signals and correspondingly control the oscillation frequency of variable frequency oscillator 27. Such first gate circuit 30 is shown to consist of AND circuits 22 and 23 having first inputs which respectively receive the signal HP and the carry output CR, while second inputs of AND circuits 22 and 23 receive, in common, a gate signal which will be later described. The outputs from AND circuits 22 and 23 are applied to phase comparator circuit 24 which is desirably a phase-frequency detector, for example, of 4044 MC, of a type available commercially from Motorola. The output from phase comparator circuit 24 is supplied to a charge pump circuit 25 which is driven by two positive and negative compared outputs from phase comparator circuit 24. The output from charge pump circuit 25 is supplied through a low-pass filter 26 as a control signal for variable frequency oscillator 27 so as to control the frequency and phase of the oscillations obtained therefrom.

Figure 4:
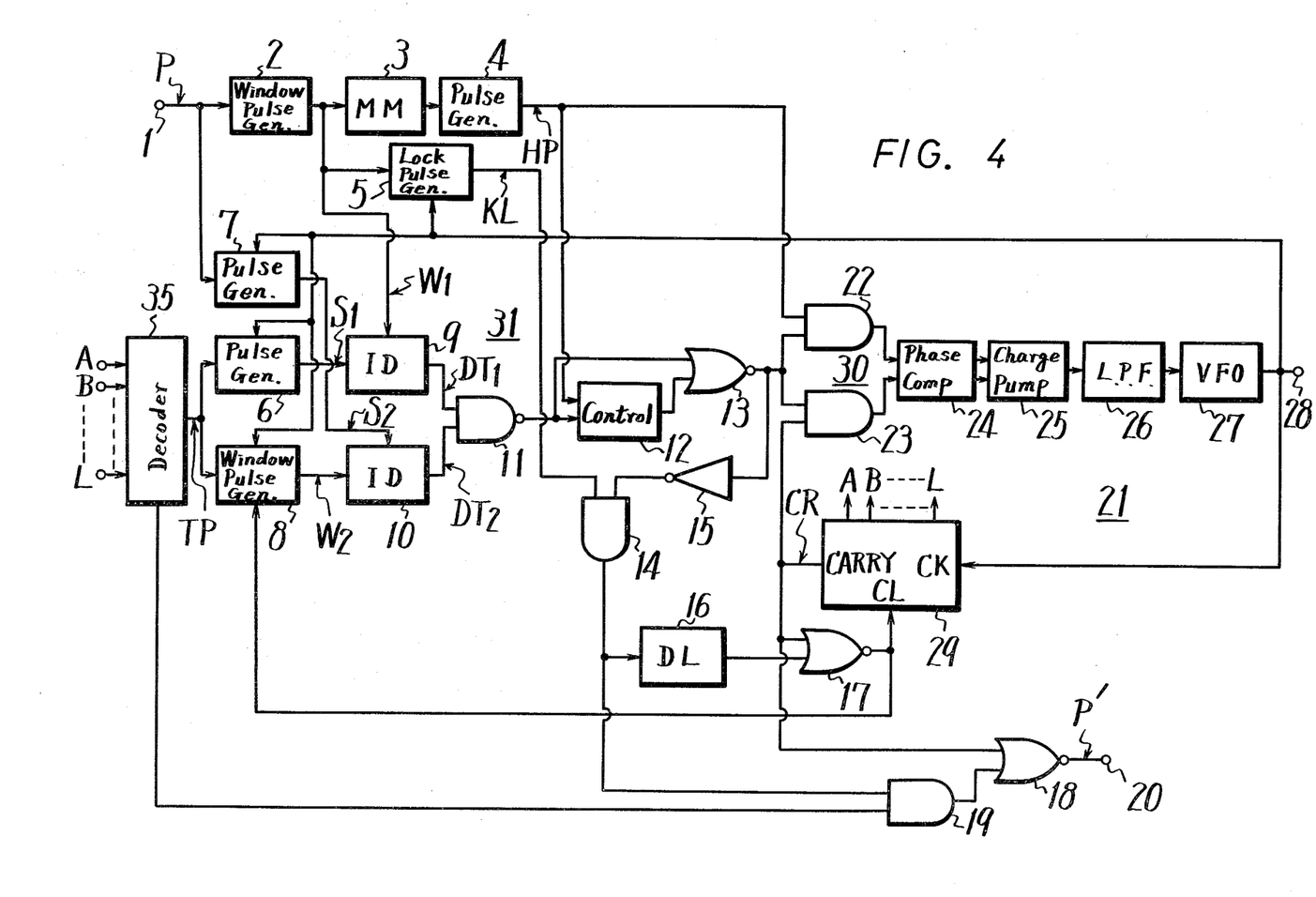
FIG. 4 is a block diagram showing details of parts of FIG. 1.

A phase fluctuation discrimination or identification circuit 31 is shown to be provided in the AFC circuit 40 of FIG. 4 for discriminating whether or not a phase fluctuation of a reproduced horizontal sync signal separated from the color video signal reproduced by a VTR exceeds a predetermined phase range. In response to such discrimination, circuit 31 is effective to selectively close and open first gate circuit 30 when the discriminated phase fluctuation exceeds, or is within the predetermined phase range, respectively. The circuit 31 is shown to include first and second identification circuits 9 and 10. The first identification circuit 9 is provided to detect that the phase of the reproduced horizontal sync signal is delayed or that a drop-out has occurred in that horizontal sync signal, and the second identification circuit 10 is provided to detect advancement of the phase of the reproduced horizontal sync signal. The reproduced horizontal sync signal P (FIGS. 5A, 6A, 7A, 8A and 9A) applied to the input terminal 1 is supplied through a first window pulse generating circuit 2, which may be formed by a monostable multivibrator, and through a monostable multivibrator 3 to a pulse generating circuit 4 which produces the previously mentioned pulse signal HP. A first window pulse $W_1$ (FIGS. 5C, 6C, 7C and 8C) is delivered from window pulse generating circuit 2 to the first identification circuit 9. The reproduced horizontal sync signal P is also fed to a pulse generating circuit 7 which provides a pulse signal $S_2$ (FIGS. 5I, 6I, 7I and 8I) supplied to the second identification circuit 10.

A decoder 35 is shown on FIG. 4 to be supplied with the contents A, B,–, L of each bit from counter 29 and produces a timing signal TP (FIGS. 5B, 6B, 7B and 8B) which occurs ahead of the first window pulse $W_1$. Such timing pulse TP is applied to a pulse generating circuit 6 and a second window pulse generating circuit 8 which is reset by the output from NOR circuit 17. Pulse generating circuit 6 provides a pulse signal $S_1$ (FIGS. 5G, 6G, 7G and 8G) which is applied to the first identification circuit 9, and second window pulse generating circuit 8 provides a second window pulse $W_2$ (FIGS. 5H, 6H, 7H and 8H) which is applied to the second identification circuit 10. Identification outputs $DT_1$ (FIGS. 5J, 6J, 7J and 8J) and $DT_2$ (FIGS. 5K, 6K, 7K and 8K) from first and second identification circuits 9 and 10 are supplied to respective inputs of a NAND circuit 11. The output of NAND circuit 11 is supplied through a NOR circuit 13 to first gate circuit 30 as a gate signal for the AND circuits 22 and 23 of the latter.

The output of NAND circuit 11 and the pulse HP from generator 4 are also applied to a control circuit 12 which, upon the electric power being turned on and there being an absence of the reproduced horizontal sync signal for more than one-half field, that is, no output from the phase fluctuation identification circuit 31, control circuit 12 produces a single pulse and supplies the same through NOR circuit 13 to AND circuits 22 and 23 for opening such AND circuits and thereby commencing the operation of PLL circuit 21.

As further shown on FIG. 4, a second gate circuit 14 is provided to function in response to the output from circuit 31 so that, when the phase fluctuation of the reproduced horizontal sync signal exceeds the predetermined phase range, gate circuit 14 passes therethrough a lock pulse having a predetermined phase relation to the reproduced horizontal sync signal for clearing the counter 29. In the illustrated embodiment, such second gate circuit 14 is shown to be constituted by an AND circuit, and the window pulse $W_1$ from the first window pulse generating circuit 2 is shown to be applied to a lock pulse generating circuit 5 which produces a lock pulse KL (FIGS. 5D, 6D, 7D and 8D) and supplies the same to AND circuit 14, and the output from NOR circuit 13 is shown to be applied through an inverter 15 as a gate signal for AND circuit 14. The output from AND circuit 14 is supplied to a clear input terminal CL of counter 29 through a delay circuit 16 for compensating the phase thereof and then through the NOR circuit 17. The lock pulse generating circit 5, pulse generating circuits 6 and 7 and the second window pulse generating circuit 8 are all supplied with the oscillating signal from variable frequency oscillator 27 so as to produce respective pulse signals in synchronism with the oscillation output from oscillator 27.

In FIG. 4, the output terminal 20 for the synthesized horizontal sync signal P' is shown to be connected with the output of a NOR circuit 18 which receives, at its inputs, the carry output CR from counter 29 and the output of an AND circuit 19. The AND circuit 19 is supplied with the output from AND circuit 14 and with an inhibit gate signal from decoder 35.

With the AFC circuit of FIG. 4, when the reproduced horizontal sync signal P is stable in phase, the carry output CR from counter 29 is delivered to output terminal 20 as the synthesized horizontal sync signal P', and the same is the case when the reproduced horizontal sync signal P is delayed in phase and has experienced a drop-out. However, when the phase of the reproduced horizontal sync signal P is advanced or ahead of the expected position, lock pulse KL from lock pulse generating circuit 5 is delivered to output terminal 20 as the synthesized horizontal sync signal P'. In the event that the reproduced horizontal sync signal P is occurring and is delayed in phase, AND circuit 19 functions to inhibit the appearance of such delayed reproduced horizontal sync signal P and the carry output CR of counter 29 is initially delivered to output terminal 20 as the synthesized horizontal sync signal P'. However, immediately thereafter, lock pulse KL from lock pulse generating circuit 5 is delivered as the synthesized horizontal sync signal P' at terminal 20.

Figure 5A:
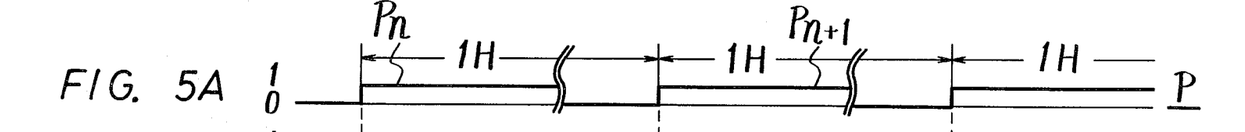
FIGS. 5A–5L, FIGS. 6A–6L, FIGS. 7A–7L, FIGS. 8A–8L and and FIGS. 9A–9H are waveform diagrams to which reference will be made in explaining the invention.
Figure 5B:
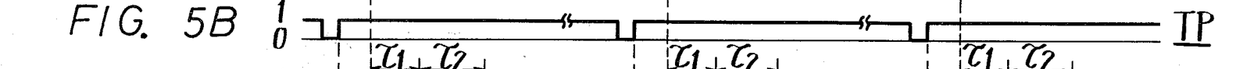
Figure 5C:
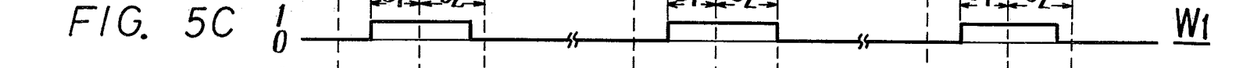
Figure 5D:
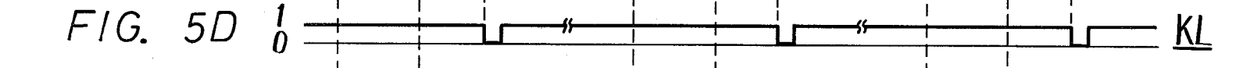
Figure 5E:
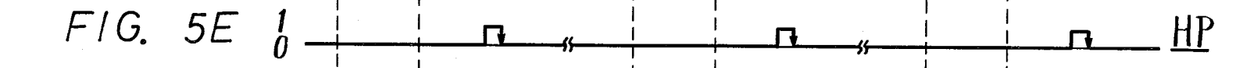
Figure 5F:
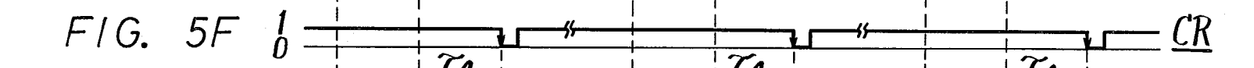
Figure 5G:
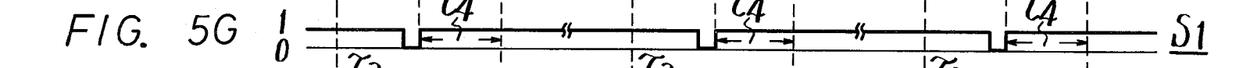
Figure 5H:
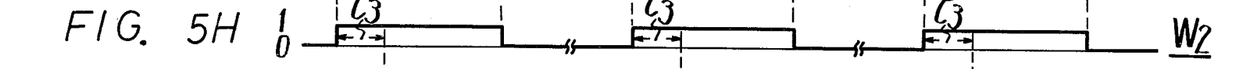
Figure 5I:
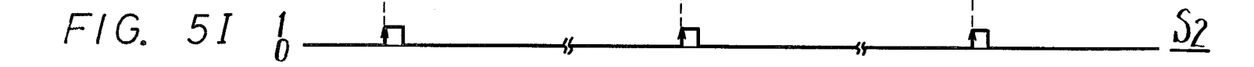
Figure 5J:
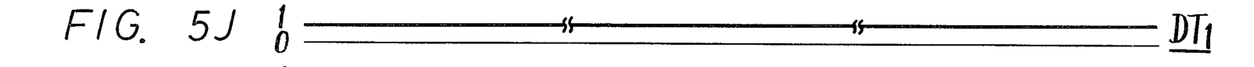
Figures 5K, 5L:
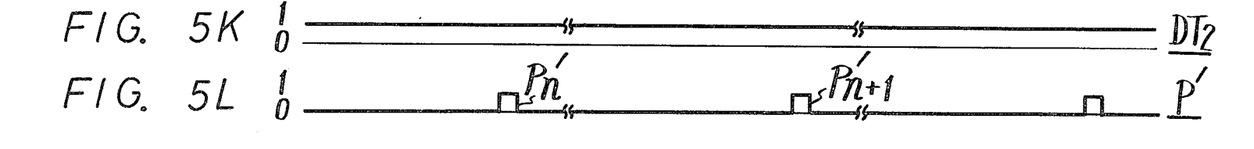
Figure 9A:
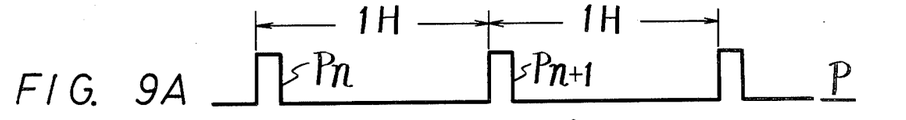
Figure 9B:
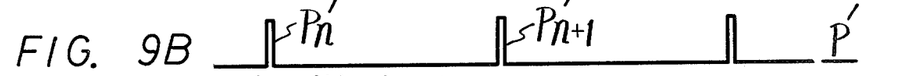
Figure 9C:
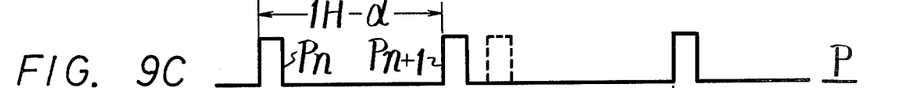

The operation of the AFC circuit shown on FIG. 4 will now be described with initial reference to FIGS. 5A–5L and FIGS. 9A and 9B which correspond to the case where no phase fluctuations appear in the reproduced horizontal sync signal P (FIGS. 5A and 9A). In FIG. 5A which shows only the rising-up portions of the horizontal sync pulses, and in FIG. 9A, a certain sync pulse of the reproduced horizontal sync signal P is indicated at $P_n$, and the following sync pulse is represented at $P_{n+1}$. FIG. 5B shows the timing signal TP delivered by decoder 35, while FIG. 5C shows the first window pulse $W_1$ provided by the respective generating circuit 2. The first window pulse $W_1$ is shown on FIG. 5C to rise up in synchronism with the rising-up of the horizontal sync pulse $P_n$, $P_{n+1}$,–, and to fall down after a predetermined time interval. As shown on FIG. 5D, the lock pulse KL from lock pulse generating circuit 5 is a negative pulse which has a predetermined phase relation to a respective pulse of the reproduced horizontal sync signal P. FIG. 5E shows that the pulse HP derived from pulse generating circuit 4 is a positive pulse which is approximately coincident, in phase, with the pulse KL. FIG. 5F shows that the carry output CR derived from counter 29 is a negative pulse, while FIG. 5G shows that the pulse $S_1$ derived from pulse generating circuit 6 is a positive pulse. The waveform of the second window pulse $W_2$ derived from second window pulse generating circuit 8 is shown on FIG. 5H, while FIG. 5I shows that the pulse $S_2$ derived from pulse generating circuit 7 is a positive pulse. FIGS. 5J and 5K show the waveforms of the outputs $DT_1$ and $DT_2$ derived from the first and second identification circuits 9 and 10, respectively. The waveform of the synthesized horizontal sync signal P' delivered to the output terminal 20 is shown on FIG. 5L to include pulses $P'_n$ and $P'_{n+1}$ which respectively correspond to the horizontal sync pulses $P_n$ and $P_{n+1}$ of the reproduced horizontal sync signal P of FIG. 5A.

Further, on FIGS. 5A–5L, $\tau_1$ represents a time period measured from the rising edge of the first window pulse $W_1$, that is, the rising edge of the reproduced horizontal sync signal P, to the rising edge of the pulse $S_1$; $\tau_2$ represents a time period from the rising edge of pulse $S_1$ to the falling edge of lock pulse KL; $\tau_3$ represents a time period from the rising edge of timing signal TP, that is, the rising edge of the second window pulse $W_2$, to the rising edge of pulse $S_2$; and $\tau_4$ represents a time period from the rising edge of pulse $S_1$ to the falling edge of carry output CR, that is, the falling edge of the second window pulse $W_2$. The durations of the first and second window pulses $W_1$ and $W_2$ are suitably selected so that the conditions $\tau_1 < \tau_4$ and $\tau_3 < \tau_2$ are satisfied, whereby to ensure that, upon a short skew, the pulse HP will not erroneously pass through first gate circuit 30 and, upon a long skew, the carry output CR will not erroneously pass through first gate circuit 30.

For the case where there is no phase fluctuation of the reproduced horizontal sync pulses $P_n$ and $P_{n+1}$, as on FIG. 5A, the following conditions are established:

Since the level of first window pulse $W_1$ is sampled at the rising edge of pulse $S_1$ by means of first identification circuit 9, output $DT_1$ therefrom is "1" and, since the level of second window pulse $W_2$ is sampled at the rising edge of pulse $S_2$ by means of the second identification circuit 10, the output $DT_2$ from the latter is also "1". Accordingly, the output from NAND circuit 11 becomes "0" and, hence, the output from NOR circuit 13 becomes "1" so as to open AND circuits 22 and 23 of first gate circuit 30. As a result, the pulse HP (FIG. 5E) having a predetermined phase relation to the reproduced horizontal sync signal P and the carry output CR from counter 29 are supplied to phase comparator 24 in which they are phase- and frequency-compared so that PLL 21 forms a closed loop. At the same time, carry output CR from counter 29 is delivered to output terminal 20 as the synthesized horizontal sync signal P' (FIGS. 5L and 9B), and AND circuit 14 is closed to block the passage therethrough of the lock pulse KL from lock pulse generating circuit 5.

Figure 6A:
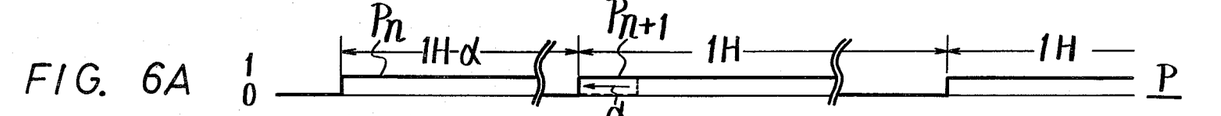
Figures 6B, 6C:
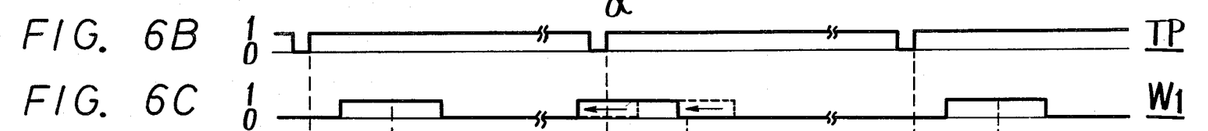
Figure 6D:
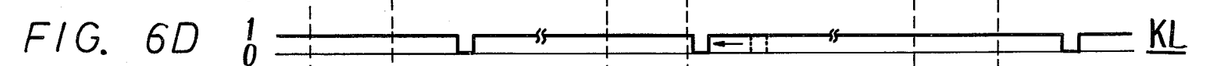
Figure 6E:
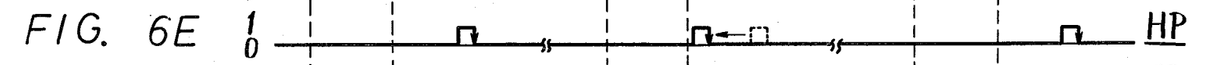
Figures 6F, 6G, 6H:
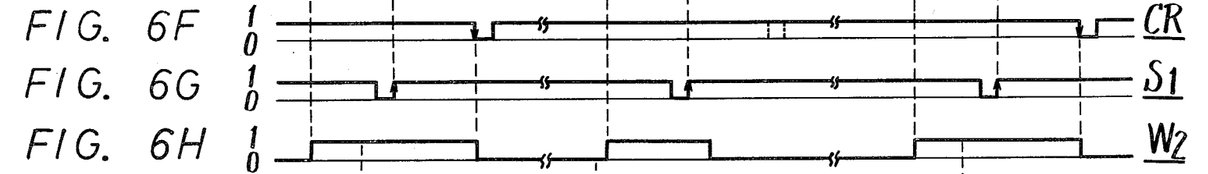
Figure 6I:
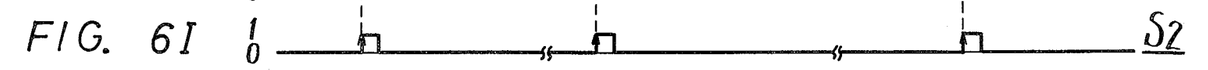
Figure 6J:
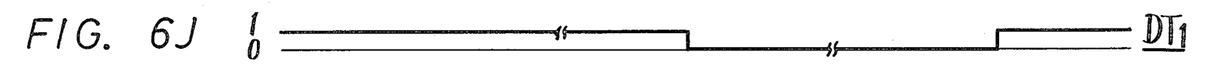
Figure 6K:
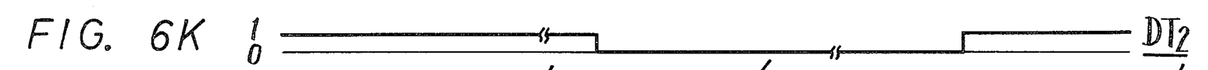
Figure 6L:
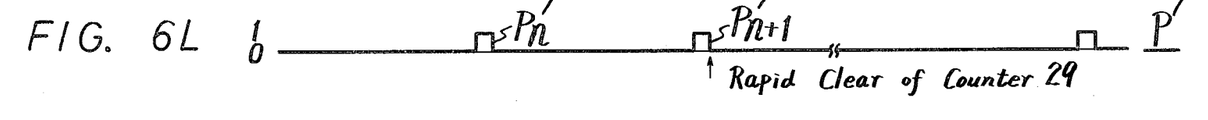
Figure 9D:
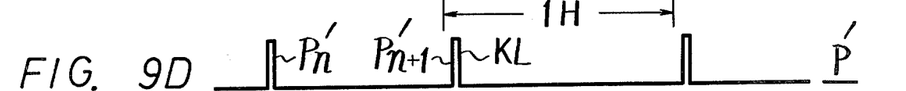
Figure 9E:
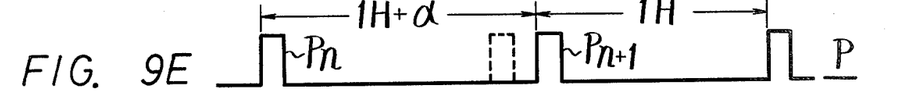

The operation of the AFC circuit shown on FIG. 4 will now be described, with reference to FIGS. 6A–6L, 9C and 9D, for the case where there is phase fluctuation in the reproduced horizontal sync signal P which causes the horizontal sync pulse $P_{n+1}$ thereof to deviate by the phase angle $\alpha$ ahead of its expected position in relation to the preceeding horizontal sync pulse $P_n$, that is, the case of a short skew. In such case, the rising edge of the pulse $S_2$ occurs at a time when there is no second window pulse $W_2$, that is, the second identification circuit 10 samples the value "0", so that the output $DT_2$ from circuit 10 is "0". Hence, the output from NAND circuit 11 becomes "1" and the output from NOR circuit 13 becomes "0" for closing AND circuits 22 and 23 of first gate circuit 30. As a result of the foregoing, no signals to be compared are fed to phase comparator 24 and the variable frequency oscillator 27 continues to oscillate at the frequency determined by the previously sensed error to supply its oscillating output to counter 29 whose carry output CR is supplied through NOR circuit 17 to the clear input terminal CL of counter 29. Since the output from NOR circuit 13 is "0", the output from inverter 15 becomes "1" for opening AND circuit 14 to the passage of lock pulse KL therethrough. Thus, the lock pulse KL is delivered through AND circuit 14, and AND circuit 19 and NOR circuit 18 to output terminal 20 as the synthesized horizontal sync signal P' (FIGS. 6L and 9D). Further, in this case, counter 29 is rapidly cleared substantially at the time of the synthesized horizontal sync signal P', that is, the time of lock pulse KL.

Figure 7A:
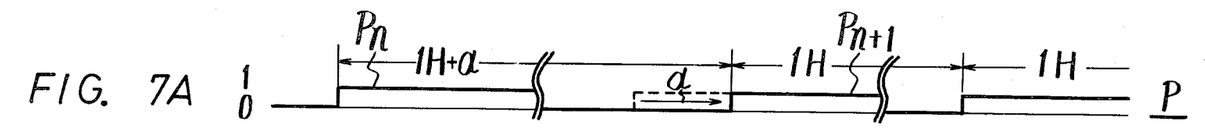
Figures 7B, 7C:
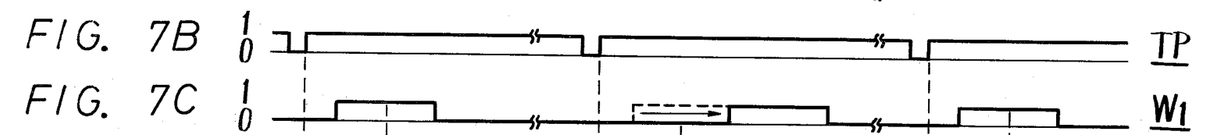
Figure 7D:
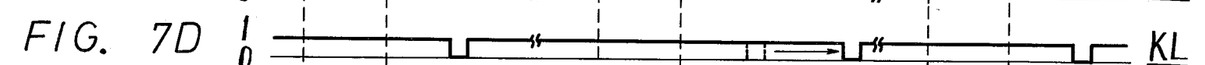
Figure 7E:
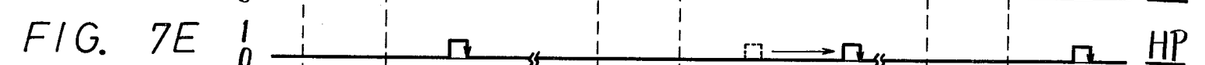
Figure 7F:
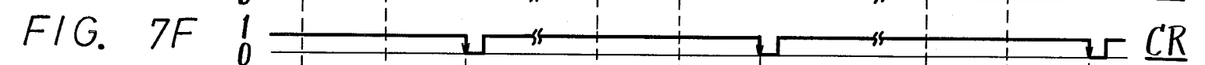
Figure 7G:
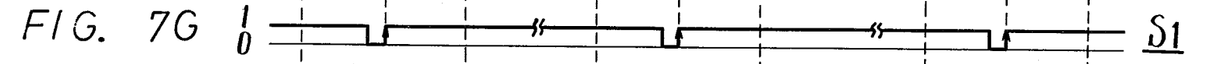
Figure 7H:
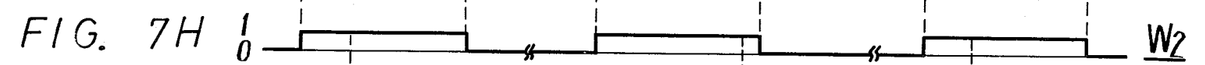
Figure 7I:
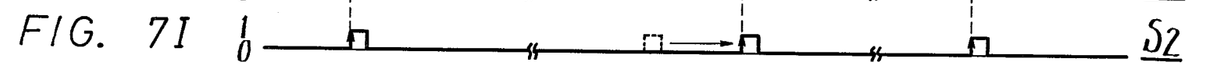
Figure 7J:
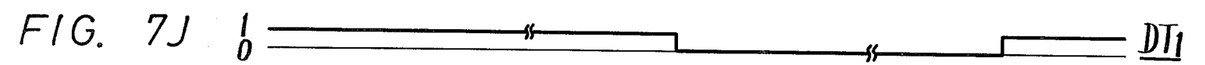
Figure 7K:
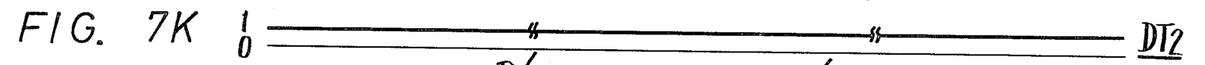
Figure 7L:
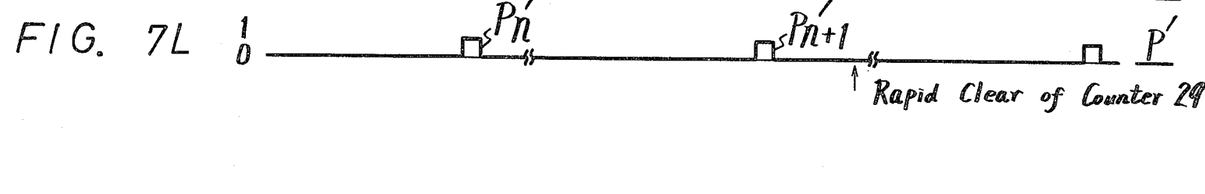
Figure 9F:
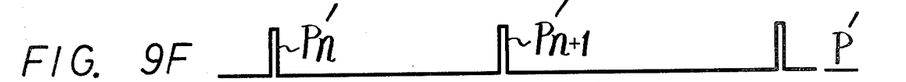

The operation of the AFC circuit of FIG. 4 for the case of a long skew, that is, for the case where the horizontal sync pulse $P_{n+1}$ of the off-tape horizontal sync signal P is delayed in phase by the amount $\alpha$ in respect to its expected position relative to the preceding horizontal sync pulse $P_n$, will now be described with reference to FIGS. 7A–7L, 9E and 9F. In such case, at the rising edge of pulse $S_1$ (FIG. 7G) there is no first window pulse $W_1$ and, therefore, first identification circuit 9 samples the value "0" so that its output $DT_1$ (FIG. 7J) becomes "0". Thus, the output from NAND circuit 11 becomes "1" and first gate circuit 30 is closed similarly to the case described above with reference to FIGS. 6A–6L. Further, the carry output CR from counter 29 is delivered to output terminal 20 as the synthesized horizontal sync signal P' (FIGS. 7L and 9F). Once again, the counter 29 is rapidly cleared at the time of lock pulse KL (FIG. 7D).

Figures 8A, 8B, 8C, 8D:
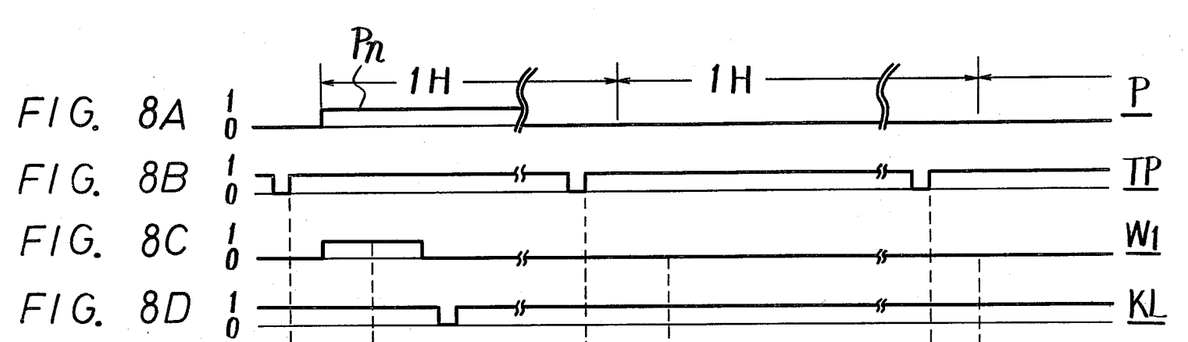
Figures 8E, 8F:
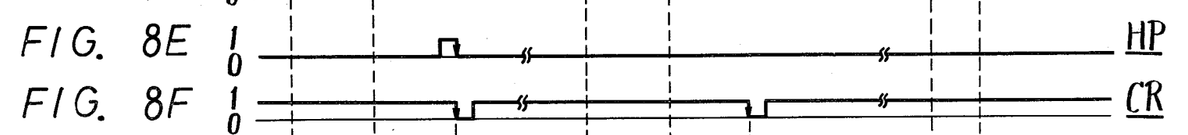
Figures 8G, 8H:
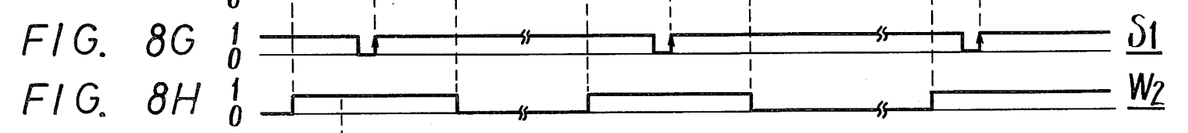
Figures 8I, 8J:
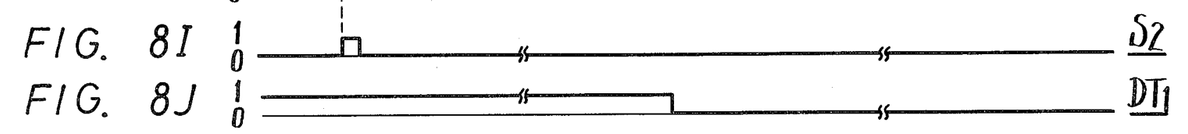
Figures 8K, 8L:
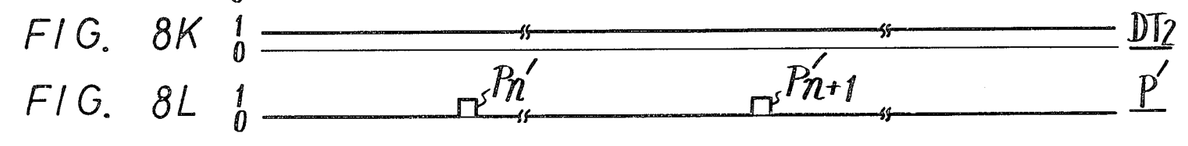
Figure 9G:
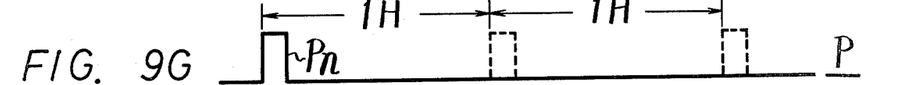
Figure 9H:
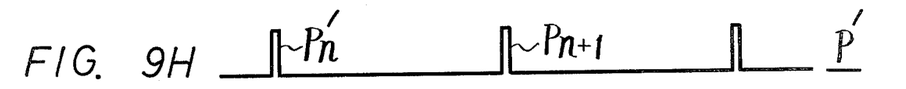

FIGS. 8A–8L, 9G and 9H relate to the situation in which, for a certain period of time after the horizontal sync pulse $P_n$ of the reproduced horizontal sync signal P, no horizontal sync pulse is obtained (FIGS. 8A and 9G). In such case, the operations of the AFC circuit of FIG. 4 are similar to those described above with reference to FIGS. 7A–7L. In other words, during the time period in which no horizontal sync pulse is reproduced, no first window pulse $W_1$ exists at the rising edge of the pulse $S_1$ so that the output $DT_1$ from first identification circuit 9 becomes "0" (FIG. 8J) and, hence, first gate circuit 30 is closed. Therefore, carry output CR from counter 29 is delivered to output terminal 20 as the synthesized horizontal sync signal P' (FIGS. 8L and 9H).

It will be appreciated that, in the APC-type color sync circuit according to the present invention, as described above, the burst signal, which is separated from a color video signal having burst signals of different phase for each succeeding line, as in the PAL color video signal, is used to produce the color sub-carrier signal of the correct phase for every line, regardless of the presence or absence of drop-out of the burst signal.

Further, when the present invention is applied to a write-in clock signal generating circuit of a time base error corrector which corrects time base fluctuation of a color video signal reproduced by a VTR, the resulting write-in clock signal is produced with the correct phase for every line, irrespective of any drop-outs in the reproduced burst signal, and is in synchronism with the color sub-carrier signal. Further, in such application of the present invention, a velocity error signal for application to a read-out clock signal generating circuit can also be positively produced.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A continuous carrier wave generating circuit for a PAL color television system, comprising:
    means for receiving a horizontal sync pulse included in a PAL color television signal reproduced from a record medium;
    AFC circuit means for generating a periodic signal having a frequency which depends on said received horizontal sync pulse of the reproduced PAL color television signal;
    means for receiving a burst signal also included in the PAL color television signal reproduced from the record medium;
    APC circuit means supplied with said periodic signal from said AFC circuit means;
    means supplied with said received first burst signal of the reproduced PAL color television signal and controlling said APC circuit means for causing the latter to produce a phase adjusted carrier wave in response to a phase of said received burst signal;
    means responsive to the presence and absence of said received burst signal for determining when drop-outs occur in said reproduced PAL color television signal; and
    phase converting means responsive to said means for determining when drop-outs occur for changing the phase of the carrier wave as phase adjusted by said APC circuit means from one to another of two phase conditions characteristic of successive lines in a PAL color television signal during drop-outs in the reproduced PAL color television signal.

2. A continuous carrier wave generating circuit according to claim 1; wherein said two phase conditions respectively correspond to $+135°$ and $-135°$ phase angles.

3. A continuous carrier wave generating circuit according to claim 2; wherein said phase converting means includes a phase converting circuit and a select switch, and when said means for determining determines that a drop-out has occurred in said reproduced signal, said select switch causes said phase adjusted carrier wave to be transmitted by way of said phase converting circuit.

4. A continuous carrier wave generating circuit according to claim 3; wherein said phase converting circuit includes inverting means, switch means and 90° phase delay means connected in series.

5. A continuous carrier wave generating circuit according to claim 4; further comprising odd-even line identification means for supplying a line identifying signal in correspondence to the phase relation between said received burst signal and said phase adjusted carrier wave, and means employing said line identifying signal for controlling said switch means to selectively apply said phase adjusted carrier wave to said phase delay means either directly or by way of said inverting means.

6. A continuous carrier wave generating circuit according to claim 1; wherein said AFC circuit means includes variable frequency oscillator means, counter means, divider means connected with the latter and providing a divided output therefrom, and means for controlling said variable frequency oscillator means on the basis of a comparison of said divided output with said received horizontal sync pulse, said divider means providing said divided output to said APC circuit means and also back to said counter means.

7. A continuous carrier wave generating circuit according to claim 6; wherein said divided output presets the contents of said counter means to a count-start condition.

8. A continuous carrier wave generating circuit according to claim 6; wherein said counter means has a compulsory reset loop made operative to reset said counter means when said received horizontal sync pulse deviates by at least a predetermined phase angle from its expected position.

9. A continuous carrier wave generating circuit according to claim 6; wherein said means for determining includes memory means for memorizing contents of said counter means at predetermined times, and digital comparator means for establishing said predetermined times by comparing the contents of said memory means with the contents of said counter means even upon a drop-out of said reproduced burst signal.

* * * * *